May 13, 1941.   A. STRAUSS ET AL   2,241,528
FOOD MIXER GOVERNOR
Filed Jan. 10, 1940

INVENTORS
Alfred Strauss
Watson D. Harbaugh
BY
Mann, Brown & Co.
ATTORNEYS.

Patented May 13, 1941

2,241,528

UNITED STATES PATENT OFFICE 2,241,528

FOOD MIXER GOVERNOR

Alfred Strauss and Watson D. Harbaugh, Chicago, Ill., assignors to A. F. Dormeyer Mfg. Co., a corporation of Illinois Application January 10, 1940, Serial No. 313,260

20 Claims. (Cl. 171—222)

The present invention relates to motor speed governors and more particularly to governors used in food mixer motors of the series wound fractional horsepower type. It will be understood, however, that many features of the present invention may be employed or adapted for motors of other types where speed control of the character herein described is found to be desirable.

It is a specific object of the present invention to provide a governor for a food mixer which automatically provides the proper beater speed for any mixture being mixed.

We have found that the consistency, viscosity or thickness of a liquid agitated by a beater, bears a direct relation to the speed at which the beater should be driven. We have also discovered that the thickness of the liquid is reflected in the torque carried by the motor.

The torque-speed curve of a mixer representing the functional relationship having the best characteristics for the purpose at hand is derived from a mixer having interdigitating beaters that subject the mixture to sheer, as well as rotary forces.

With this type of agitation, the torque mounts in relation to the viscosity or thickness due to the magnification of the compression and sheer of interdigitation existing in the action of the beaters as distinguished somewhat from the load on a single beater that is principally rotary in action.

It has been the conventional practice to hand set the governor at different speeds for mixing liquids of different viscosities, according to certain indicia, provided upon the governor control. These indicia are generally of two types, a numerical sequence, or instructions that of necessity must be very brief. Obviously, these are merely guides to assist the operator. In either case, even with the best of indicia, the setting of the governor for the correct speed involves judgment and guess work. Moreover, in those instances where instructions are used, the instructions can not be followed if, due to individual tastes of certain operators, the viscosity of the identified mixture was not that which was contemplated by the manufacturer when he formulated the instructions as standardized for the public at large.

Moreover, difficulty was experienced where different ingredients were added from time to time, as when mixing cakes. Each time an ingredient was added that changed the thickness of the mixture, the speed control had to be reset by the operator if the proper mixing speed was to be maintained for all periods of mixing.

One of the objects of the invention is to obviate these difficulties, it being a further object of the invention, in this connection, to provide a speed governor control which can be set by hand at any selected top speed for any given mixture, and from there will automatically regulate the beater speed in relation to the variations in thickness created by the addition of ingredients to the mixture.

Another object is to impose upon a motor having a typical torque-speed curve, a secondary curve of automatic operation which is related to the speed required for the proper agitation of a wide range of mixtures varying in thickness.

In addition to this it is desirable to provide a governor which can be set at a given point and the correct speed for any mixture will be provided whether the information necessary for a proper hand setting is given or not.

Another object of the invention is to provide an automatic speed control for a food mixer which when used to power a food processing attachment such as a fruit juicer will propel the reamer at a rapid rate and as the rind is approached will reduce the speed to lessen the possibility of undesirable rind oils being extracted with the juice.

Another object is to provide a load-speed governor and food mixer simple and rugged in construction, efficient and easily managed by those not skilled mechanically, and inexpensive to manufacture.

These being among the objects of the invention, other and further objects will become apparent from the drawing herein, the description relating thereto and the appended claims.

Referring now to the drawing.

Torque in a food mixer is reckoned with at two points; the shaft load, and the electric power consumed by the motor. Although the present invention could be illustrated for the purpose at hand in connection with a means for controlling the power input of the motor such as a variable resistance, we prefer to illustrate the invention in connection with a current interrupter switch governor in the motor circuit as controlled by centrifugal force developed from the speed of the motor. This enables a more extensive disclosure of the invention.

Figure 1:
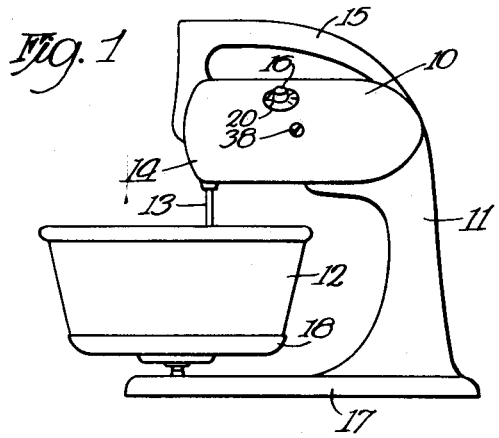
Fig. 1 is a reduced side elevation of a mixer in which the invention is embodied.

In Fig. 1 a mixer is shown comprising a motor unit 10 mounted on a stand 11 to overhang a bowl 12 so that beaters 13 carried by the transmission 14 may be powered from the motor when disposed in the bowl. A handle 15 is secured to the motor unit so that the mixer can be managed, and the handle for the speed control governor is indicated on the near side of the handle as at 16 where it is convenient to reach. A base 17, common to the support 11 and bowl 12 is provided and a turntable 18 is mounted on the base to permit rotation of the bowl.

The hand set comprises an indicator plate 20 which resiliently engages detents in the back of the handle 16 that locate and hold the handle at various positions as the handle is rotated to impart axial movements to a shaft 21 threaded in the casing. The inner end of the shaft moves one end of a pivotally mounted crank lever 22 that carries at the other end, one of the contacts 23 of the interrupter switch mentioned. The switch will hereafter be referred to by the numeral 24.

The other contact 25 of the switch 24 is carried by a centrally apertured flexibly mounted arm 26 that is moved axially of the motor shaft 27 by an outwardly grooved collar 28 which in turn is actuated by three radially spaced centrifugal elements 30 pivotally mounted as at 31 upon an armature plate 32. The plate 32 carries stops 33 that prevent excessive movement of the elements 30.

The arm 26 is mounted at 34 upon a mounting plate 35 in common with brush holders 37 that have service caps 38 threaded thereon to hold the brushes 36 removably in place. The mounting plate 35 is in turn secured by screws 40 against threaded bosses 41 cast integrally with the motor casing.

Figure 4:
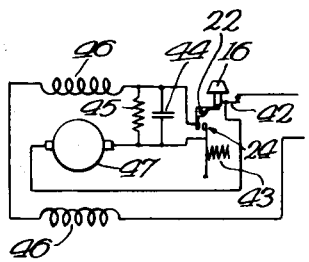
Fig. 4 is a wiring diagram of a preferred form of the motor as controlled by the invention.
Figure 2:
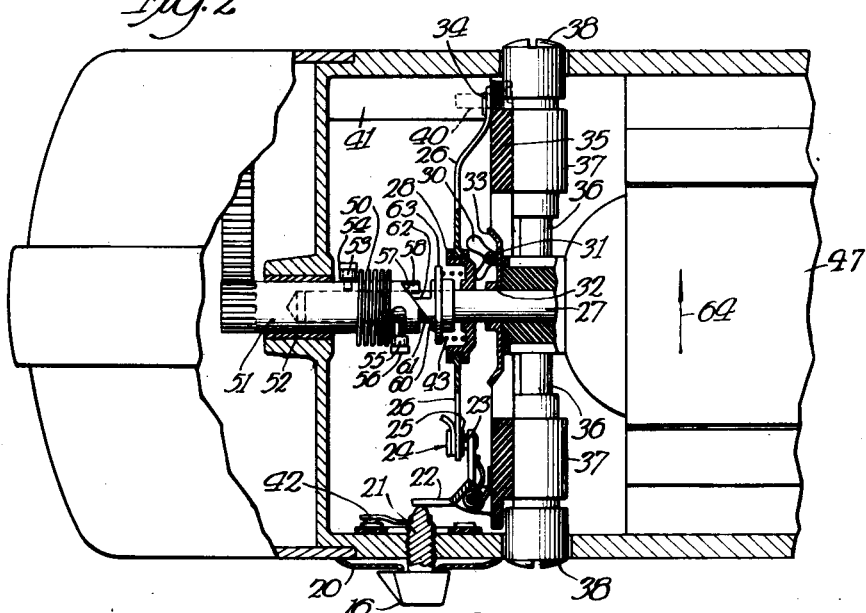
Fig. 2 is a broken away view through the top of the motor housing showing the governor as constructed according to a preferred form of the invention.
Figure 3:
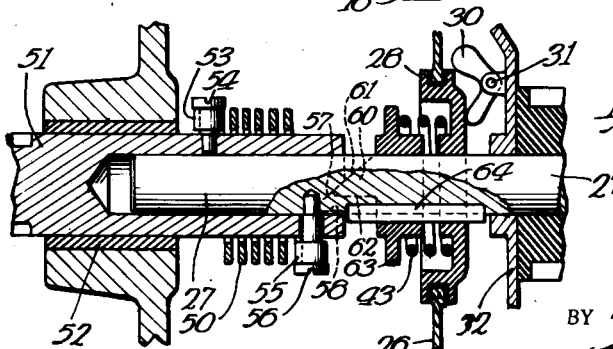
Fig. 3 is an enlarged section through the shaft.

In operation, when the rotary main switch 42 is closed, as controlled by the handle 16, the motor will start and accelerate until the governor elements 30 force the arm 26 far enough to the left, as viewed in Fig. 2, against the tension of a compression spring 43, to cause the contacts of the switch 24 to separate. This point of separation will be determined by the set of the handle 16. When the contacts separate, the condenser 44 and resistance 45 that shunt the switch 24 (Fig. 4), as connected in series with the field 46 and rotor 47, take the surge of the break in circuit and the motor slows down, only to be accelerated again when the contacts again close. Thereafter the motor "hunts" the speed determined by the set of the handle 16 in relation to the action of the centrifugal elements 30.

Thus the speed of the motor is kept substantially constant within the load carrying capacity of the motor for that speed. If the motor's capacity for that speed is exceeded, the contacts remain closed, and the motor enters the characteristic load-speed curve of that particular series wound motor.

Of course the load speed curve that is typical to a series wound motor, is one wherein the motor slows down with load increases but it is to be noted that this curve is not controllable or variable as desired for the purpose of the present invention.

In providing a means for imposing a secondary load speed curve of function upon the motor, two end results may be attained with the present invention, namely, operation under a fixed curve or under a variable curve. If it is desired to provide for a fixed secondary curve two functional relationships can be established in the mechanism shown.

The contact 23 may be held at a constant position or the tension on the spring 43 may be held constant, provided one or the other is varied while the other is held constant.

In the present disclosure, however, we prefer to illustrate the invention by an embodiment in which the secondary curve can be varied. In the relationship shown the tension on the spring 43 is varied automatically while the position of the contact is varied by the handle 16, although the converse may be provided if desired.

In varying the tension on spring 43, we collapse it in a way so correlated to the action of the centrifugal elements 30 that proper variations in tension are provided as required for operation under the secondary curve.

In doing this, we provide a means for measuring the torque transmitted by the shaft at any and all speeds, and this means, in the embodiment illustrated, comprises a torsion spring 50 interconnecting the driving shaft 27 and a sleeve 51 that journals the front end of the shaft 27. The sleeve 51 in turn is journalled in a bearing 52 in the front wall of the motor housing and the outer end of the sleeve 51 is provided with gear teeth to drive the gear train of the beater 13.

The spring 50 is preferably wound in a direction to tighten or lessen its diameter under the influence of torque and, as mounted, is secured at one end to the sleeve 51 through an eyelet 53 by a stud bolt 54, and at the other end to the shaft 27 through an eyelet 55 by second stud bolt 56 threaded in the shaft 27. In this way there is provided a relative rotation between the sleeve and the shaft under variations in torque transmitted.

The sleeve 51 is provided with a circumferential slot extending through an arc of about 90° of its circumference to receive the stud 56 and permit relative rotation between the sleeve and shaft. Although this is not necessary where the cam tooth construction, about to be described, is employed, this does provide an additional safety factor against complete failure of the mixer if the spring is ever broken. The stud runs to the end of the slot and serves as a direct contact drive under these circumstances.

The shaft end of the sleeve 51 is provided with two circumferentially spaced cam inclines 57 deepening in the direction of rotation and terminating in shoulders 58. A follower 60 for the cam inclines 57 is provided with inclines 61 mating with the inclines 57, and with shoulders 62 adapted to engage and drive the shoulders 58 if the torque exceeds the capacity of the spring 50 or in event the spring 50 fails.

The follower 60 has a radial shoulder 63 thereon which collapses and varies the tension on the spring 43 as the cam inclines 57 and 61 coact in relation to the action of the spring 50 under variations in torque loads. This coaction is assured by keying the follower 60 to the shaft 27 as by key way and key assembly indicated at 64 to provide a sliding drive relationship.

The direction of rotation of the driving shaft 27 is indicated by the arrow 69. As the torque increases upon the sleeve 51, the spring 50 yields, permitting the shaft 27 to overrun the sleeve 51 in proportion to the torque existing. As the sleeve and shaft overrun, the inclines 57 and 61 yield to permit axial movement of the follower to the left, thereby proportionately relieving the tension as the spring 43 opposes the action of the centrifugal elements 30.

As the tension on the spring 43 is lessened, the centrifugal elements will act more promptly or at a lower speed to cause a separation of the contacts of the switch and thereby accomplish a proportional reduction in speed. In this way the speed of the motor is controlled in relation to the torque.

In view of the fact that the beaters 13 may be any one of a number of types, we have confined the description to the principles by which a mixer may be constructed to operate along a secondary load speed curve. In applying the principles for any given beaters, motor or mixture range, the parts are varied to fill the needs of any desired application.

In addition to the features described, it will be noted that this arrangement also provides a resilient drive in the power transmission train which will absorb, to a certain extent, shocks developed at the beaters. In fact, if the beaters were to become tangled with a knife or spoon the speed and power of the motor would be cut instantly to a very low factor. The moment the load mounts suddenly the contacts break and the electric power is interrupted. Only the inertia of a rotating armature is expended in the sudden slowing down of the mixer.

Having thus described a preferred embodiment of the invention, the principles and mode of operation thereof, it will be apparent to those skilled in the art that various uses, modifications, changes and adaptations other than those mentioned may be made without departing from the spirit and substance of the invention, the scope of which is commensurate with the appended claims.

What is claimed is:

1. In a motor driven food mixer, a drive and driven shaft, torsion means connecting the shafts in drive relationship and responsive to torque differentials between the shafts, speed control means associated with said torsion means and cooperative therewith to vary the speed of the motor in relation to the torque differentials.

2. In a motor driven food mixer, a drive and driven shaft, means connecting the shafts in drive relationship and responsive to torque differentials between the shafts, speed control means controlling the speed of the motor including a resilient element, said element being controlled by said connecting means to vary the speed of the motor in relation to said torque differentials.

3. In a food mixer driven by a motor, means for governing the speed thereof, and means responsive to variations in torque carried by the motor for controlling the operation of the governing means to vary the speed in relation to the torque variations.

4. In a food mixer driven by a motor, manually adjustable means for governing the speed thereof to maintain substantially constant speed at any given setting, and means responsive to variations in torque carried by the motor for controlling the operation of the governing means by varying its reactance to speed at said setting.

5. In a food mixer driven by a motor, a speed governor connected in circuit with the motor, and torque responsive means cooperating with the governor to vary the speed of the motor in relation to the load carried by the motor.

6. In a food mixer driven by a motor, a speed governor connected in circuit with the motor, means for locating the governor at any given setting, torque responsive means, means interconnecting said torque responsive means and the governor to vary the speed of the motor in relation to the load carried by the motor.

7. In a food mixer driven by a motor, means for governing the speed thereof to maintain substantially constant speed at any one of a number of settings and means responsive to variations in torque carried by the motor for controlling the operation of the governing means to vary the speed in relation to the torque.

8. In a food mixer driven by a motor, means for setting the motor to operate within a predetermined range of speeds and means controlled by torque for automatically varying the speed of the motor within said zone of operation in relation to the torque.

9. In a motor driven food mixer, a drive and driven shaft, torsion means connecting the shaft in drive relationship and yielding under variations in the load carried by the shafts to permit relative rotation of the shafts, governor means operated by one of the shafts and automatically maintaining the speed of the motor substantially constant at any one of a plurality of predetermined speeds and means actuated by the relative rotation of the shafts for automatically controlling the governor means to vary the speed at which said governor means is operative in maintaining the speed constant.

10. In a motor driven food mixer, a drive and driven shaft, means interconnecting the shafts in drive relationship and providing a relative rotation therebetween under load variations to which the shafts are subjected, governor means automatically maintaining the speed of the shafts constant at any one of a plurality of predetermined speeds, manual means for varying the setting of the governor means as regards the speed maintained thereby and means actuated by the relative rotation of the shafts for automatically controlling the governor means to vary the speed at which the governor means is operative in maintaining the speed constant.

11. In combination with an electric motor, a centrifugal speed governor for the motor to control the speed thereof, torque responsive means driven by the motor, and carrying a varying torque load, and means controlled by said torque responsive means for controlling the speed governor for varying the speed controlled by the governor in relation to the torque.

12. In combination, a drive and driven shaft, power means for rotating the drive shaft, torque responsive means interconnecting the shafts in drive relation, speed control means for controlling the speed of said drive shaft and means controlled by said torque responsive means and controlling said speed control means to vary the speed at which said speed control means operates in relation to the torque carried by the driven shaft.

13. A motor control comprising means for governing the speed thereof, and means responsive to variations in torque carried by the motor for controlling the operation of the governing means.

14. A motor control comprising means for maintaining the speed of the motor constant, and means responsive to variations in the torque carried by the motor for controlling the first means to vary the speed at which said first means operates to maintain the speed of the motor constant.

15. A motor control comprising a drive and driven shaft, torque responsive means interconnecting the shafts in drive relationship, a governor for controlling the speed of the motor, and means controlled by said responsive means for controlling the governor to vary the speed controlled by the governor in relation to variations in the torque carried by the driven shaft.

16. In combination with a circuit interrupting speed governor for a universal motor, a shaft driven by the motor, load responsive means interconnecting the motor controlled by said responsive means and controlling said governor for varying the speed controlled by the governor in relation to said load.

17. In combination with a prime mover, means for varying the power output of the prime mover without varying the speed, means for adjusting the first means to vary the speed setting thereof, a shaft carrying a varying torque load and means responsive to said torque variations for driving the shaft from the prime mover and coacting with the first two means for varying the speed of the driven shaft in relation to the torque variations.

18. In a food mixer having a motor, the combination of a drive and driven shaft, means for driving one shaft from the other and responsive to variations in the torque load carried by the driven shaft, and means coacting with said first means for varying the speed of the driven shaft in relation to the torque variations carried thereby.

19. In a food mixer having a motor, the combination of a drive shaft, a driven shaft, means transmitting power from one shaft to the other and automatically responsive to variations in torque between the shafts, and manually controlled governor means cooperating in coacting relationship with the first means for regulating the speed of said driven shaft in relationship to the said variations in torque.

20. In a speed control, a drive shaft driven by a prime mover, a driven shaft, means for driving the driven shaft from the drive shaft and responsive to variations in the torque load carried by the driven shaft, means coacting with said first means for varying in relation to the torque variations the speed at which the driven shaft is driven, and adjustment means for controlling the operation of the second means.

ALFRED STRAUSS.
WATSON D. HARBAUGH.